March 8, 1966     W. F. HUCK     3,238,926
ENVELOPE OPENING MACHINE
Filed Dec. 12, 1961     9 Sheets-Sheet 1

INVENTOR
WILLIAM F. HUCK
BY
ATTORNEY

March 8, 1966  W. F. HUCK  3,238,926
ENVELOPE OPENING MACHINE
Filed Dec. 12, 1961  9 Sheets-Sheet 3

Fig.8a

INVENTOR
WILLIAM F. HUCK
BY
ATTORNEY

Fig. 9b

INVENTOR
WILLIAM F. HUCK
BY
ATTORNEY

March 8, 1966 W. F. HUCK 3,238,926
ENVELOPE OPENING MACHINE
Filed Dec. 12, 1961 9 Sheets-Sheet 6

Fig. 9c

INVENTOR
WILLIAM F. HUCK
BY
ATTORNEY

March 8, 1966 W. F. HUCK 3,238,926
ENVELOPE OPENING MACHINE
Filed Dec. 12, 1961 9 Sheets-Sheet 7

INVENTOR
WILLIAM. F. HUCK
BY
ATTORNEY

INVENTOR
WILLIAM F. HUCK
BY Albert C. Johnston
ATTORNEY

United States Patent Office 3,238,926
Patented Mar. 8, 1966

3,238,926
ENVELOPE OPENING MACHINE
William F. Huck, 81 Greenway Terrace,
Forest Hills, N.Y.
Filed Dec. 12, 1961, Ser. No. 158,664
18 Claims. (Cl. 120—35)

This invention relates generally to an envelope or mail opening machine.

Business, charitable and government organizations frequently receive large volumes of mail contained in uniformly sized envelopes, for example, when return envelopes are provided for the payment of bills or taxes or for responses to charitable appeals. When large volumes of such mail are received, much effort and labor is required to open the envelopes and remove the contents thereof prior to further processing such as sorting and filing of the contents.

In the past, it has been the usual practice to effect opening of the envelopes by manually arranging a stack thereof and jogging the stack so as to locate the contents of each envelope away from an edge thereof which is to be cut, whereupon the envelopes are manually fed through a shear cutting device operative to cut one edge of each envelope. Since such shear cutting device requires the removal of at least 0.06 inch of material from the envelope in order to ensure that the edge will be cut properly, damage to the contents of the envelope is frequently difficult to avoid, and this is particularly disadvantageous in the case where the contents consist of punched cards or folded letters.

If more than one edge of each envelope is to be cut, the above described existing procedure requires successive passes of the envelopes through the shear cutting device, with danger of damage to the contents in each pass, and prior to each pass through the shear cutting device the envelopes must be jogged so as to locate the contents of each envelope away from the edge thereof which is thereafter to be cut. If each envelope is to be cut along three edges so as to provide easy access to the contents of the cut envelope by unfolding the two leaves thereof about the remaining or fourth edge, there is the ever present danger that the contents of the envelopes may be spilled, mixed, or separated from the envelopes, or otherwise harmed during the repeated handling and jogging that is required. Accordingly, special care must be exercised when cutting envelopes along three edges thereof, and such special care usually involves individually handling each envelope while the latter is successively turned in the three directions for cutting three edges thereof, whereupon the next envelope is similarly handled.

It will be apparent from the above that the existing procedures employed for cutting envelopes along three edges require considerable manual labor. Even more manual labor is required when each envelope is cut along only one edge by passage through a shear cutting device and thereafter is manually torn along one or more edges thereof so as to facilitate removal of the contents, or when the contents are pried from the envelope through the opening defined by the single cut edge. Such purely manual labor greatly reduces the efficiency of the clerks or other personnel in performing their primary tasks of reading and sorting the contents of large volumes of mail.

Accordingly, it is an object of the present invention to provide a machine for automatically opening envelopes so that the contents are fully exposed and can be easily removed and sorted without requiring handling of the envelopes during opening thereof.

Another object is to provide a machine of the described character operative to cut the envelopes along three edges thereof and then to unfold the cut envelopes along the remaining or fourth edge so that the contents are fully exposed for removal and sorting.

A further object is to provide an envelope opening machine by which cutting and unfolding operations are performed during the continuous movement of envelopes in a substantially rectilinear path so as to permit high speed operation of the machine and the expeditious handling of large volumes of mail.

It is another important object of the invention to provide a machine of the described character which cuts the successive envelopes along three edges thereof in a manner ensuring the consistent and reliable cutting of each of the edges through the removal of a minimum width of the material of the envelope so that the cutting of the three edges of each envelope may be performed while the latter moves along a substantially rectilinear path without the danger of cutting or otherwise harming the contents of the envelope.

Still another object is to provide a machine of the described character which automatically halts operation in the event that two or more envelopes are simultaneously conveyed therethrough, which condition would affect the unfolding operation of the machine.

A further object is to provide an envelope opening machine of the character above indicated which is conveniently adjustable for use in opening envelopes of different sizes.

In accordance with the invention, an envelope opening machine is provided which comprises, in general, conveying means for transporting the successive envelopes from a feed station or magazine in a substantially rectilinear path, a cross cutting device operative to trim from each envelope the leading edge thereof at one location in its path of movement, and side cutting devices acting at another location in the same path as the envelope is moved through that location for simultaneously trimming off both side edges of each envelope.

According to an aspect of the invention, cutting devices are provided as parts of the machine which will precisely control the width of material trimmed from any of the edges of each envelope so that the amount of material removed will be sufficient to ensure the reliable opening of the envelope edge but will be so small that the contents of the envelope are safeguarded against damage due to the cutting operations.

More specifically, each of the cutting devices is made to include two relatively movable cutting blades and an abutment surface fixed in relation to one of the blades at a predetermined small distance from the cutting edge of the latter, and the edge of the envelope to be trimmed is urged against the abutment surface so that the width of material trimmed off the envelope by each cutting device is precisely equal to the small distance between the abutment surface and the cutting edge of the related blade.

In accordance with another aspect of the invention, successive envelopes which have had their leading and opposite side edges trimmed off, and which thereby consist of top and bottom leaves joined together along only the trailing edge with the contents of the envelope therebetween, are transported past suction means disposed above the path of travel, and acting upon the top leaf of each cut envelope so as to lay back the top leaf about the trailing edge of the envelope into the plane of the bottom leaf, thereby completely exposing the contents for easy removal from the unfolded envelope.

The cross-cutting device for trimming off the leading edge of each envelope includes a fixed blade extending across the path of movement of the envelopes and a movable blade carried by a rotor which is rotatable about an axis extending parallel to the fixed blade and being positioned to that the cutting edge of the movable blade passes closely adjacent to the cutting edge of the fixed blade to shear an envelope therebetween; the rotor advantageously having an arcuate abutment surface lying ahead of the movable blade in the direction of rotation of the rotor and being spaced radially inward from the cutting edge of the movable blade by a small distance corresponding to the desired width of material to be trimmed from the leading edge of each envelope; and the movement of the envelope conveyor being synchronized with the rotation of the rotor so that the leading edge of each envelope comes into contact with the abutment surface prior to shearing by the blades, thereby to ensure that the width of material removed from the leading edge by the blades is equal to the small radial distance between the cutting edge of the movable blade and the adjacent abutment surface.

The rotor of the cross-cutting device preferably has its axis of rotation spaced from the path of movement of the conveyed envelopes and includes a radially extending blade carrying structure of limited angular extent which moves through the path of the envelopes during a portion of each revolution of the rotor and which is completely withdrawn from the path of movement of the envelopes during the remainder of each revolution, and the movement of the envelope conveyor is further synchronized with the rotation of the rotor so that the blade carrying structure of the latter moves through the path of movement of the envelopes in advance of each envelope which has its leading edge trimmed off by the cross-cutting device, thereby to permit further movement of the envelope in that path.

Each of the side cutting devices for trimming off the side edges of each envelope is made to include upper and lower circular cutting blades having overlapped cutting edges lying in a common plane to shear the adjacent envelope edge as the envelope is passed by the blades. Each upper blade is mounted for rotation with its cutting edge maintained at a fixed axial distance inwardly from an abutment surface which is engaged by the adjacent side edge of an envelope during the side cutting operation so that the width of material removed from the side edge of the envelope will be precisely equal to the axial distance between the cutting edge and the abutment surface.

The abutment surface of each side cutting device is advantageously annular and radially directed and defined on a structure which has the associated upper blade mounted to it so that the upper blade and annular abutment surface rotate together to avoid even slight variations in the axial distance between the abutment surface and the cutting edge of the associated upper blade.

Further, means are preferably associated with each side cutting device for holding the side edge of each envelope in contact with the abutment surface during the shearing action of the blades.

A preferred arrangement simultaneously trims off both side edges of each envelope by locating the two side cutting devices in lateral alignment with each other at opposite sides of the path of movement of the conveyed envelopes. In that arrangement, the side cutting devices are laterally adjusted so that the axial distance between their abutment surfaces is less than the lateral dimension of the envelope being opened, whereby each envelope is bowed slightly out of a flat plane when its side edges engage the abutment surfaces so as to hold the side edges in close contact with the abutment surfaces and thus ensure that the desired width of material will be removed from each edge.

In conveying the successive envelopes in a substantially rectilinear path during the trimming-off of the leading edge and both side edges of each envelope, a preferred embodiment of the invention employs a conveyor assembly that includes first conveyor members guided to have runs extending parallel to and flanking the path and supporting pushers projecting upwardly through the path during movement along said runs for engagement with the trailing edge of each envelope, and the cross-cutting device acts to trim-off the leading edge of each envelope during transport of the latter by the pushers so that the cross-cutting device can extend across the entire leading edge of each envelope without interference from the laterally spaced apart first conveyor members. Further, the conveyor assembly includes second endless conveyor members guided to move along parallel runs and from which pushers depend for engagement with the trailing edge of each envelope so as to convey the latter on a supporting surface during the trimming-off of both side edges of the envelope by the side cutting devices which are spaced outwardly with respect to the second endless conveyor members. The supporting surface on which each envelope is moved by the second conveyor members extends longitudinally from the delivery end of the first conveyor members and is spaced upward from the plane of the runs of the latter so that the movements of the pushers carried by the first and second conveyor members can be synchronized to provide the engagement of the pushers of the second conveyor members with the trailing edge of an envelope as the latter approaches the end of the runs of the first conveyor members, while avoiding interference between the pushers of the second conveyor members and the pushers of the first conveyor members. In order to transfer each envelope from the first conveyor to the second conveyor, rotary lifting means are provided at the delivery end of the runs of the first conveyor members to raise each envelope to the level of the supporting surface associated with the second conveyor members.

In order to support each envelope during movement thereof by the pushers carried by the first conveyor members, auxiliary conveyor members are guided to have runs parallel to the runs of the first conveyor members and carry laterally extending support bars, and the movements of the first conveyor members and auxiliary conveyor members are synchronized with the rotation of the rotor of the cross-cutting device to avoid interference between the latter and the support bars and pushers of the first conveyor members. Further, the first conveyor members and the auxiliary conveyor members are advantageously driven through first and second rotary drive members which are angularly adjustable relative to each other to vary the distance along the path of movement of the envelopes between the related pushers and support bars and thereby accommodate envelopes of different sizes, while the rotor of the cross-cutting device is also driven through the second rotary drive member to maintain the positional relationship between the rotor and support bars.

The above, and other objects, features and advantages of the invention, will be apparent in the following detailed description of illustrative embodiments thereof which is to be read in connection with the accompanying drawings forming a part hereof, and wherein.

Figures 3, 4, 5, 6, 7:
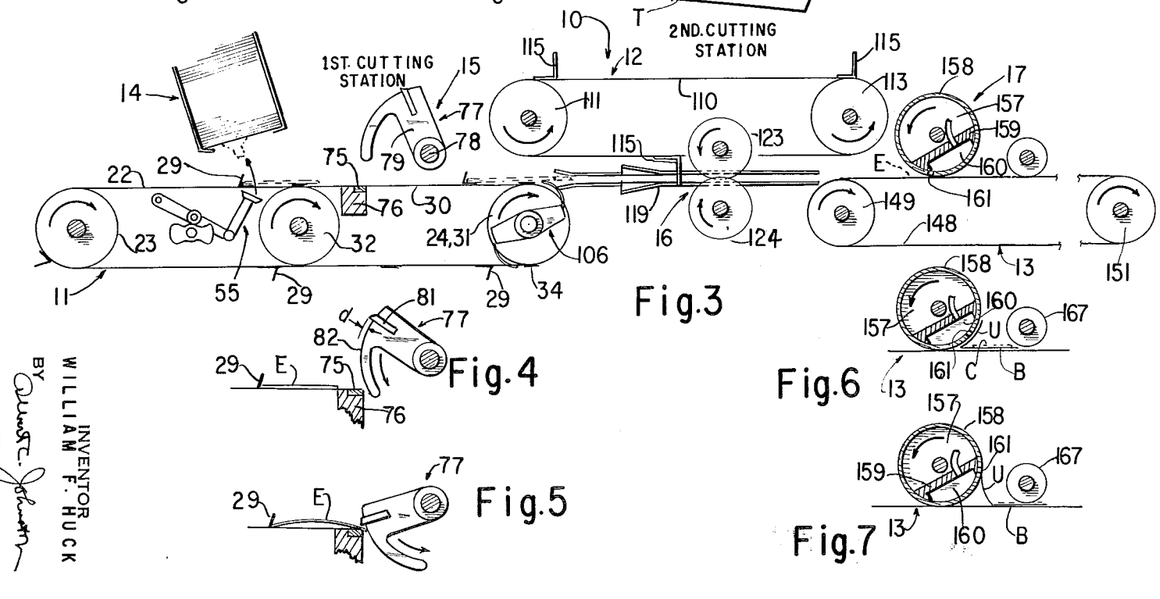
FIG. 3 is a diagrammatic view illustrating the operations performed by the machine embodying this invention during the opening of envelopes.
FIGS. 4 and 5 are diagrammatic views showing successive stages in the operation of a cross-cutting device appearing at a first cutting station on FIG. 3 and which is provided to trim the leading edge from each envelope.
FIGS. 6 and 7 are diagrammatic views showing successive stages in the operation of an unfolding device also included in the envelope opening machine of FIG. 3.

Referring to the drawings in detail, and initially to the schematic view of FIG. 3, it will be seen that an envelope opening machine 10 embodying this invention generally includes a conveyor assembly made up of first, second and third conveyors 11, 12 and 13, respectively, arranged in succession and operative to transport successive envelopes in a substantially rectilinear path following delivery of the envelopes from a stack thereof contained in a magazine 14 disposed above conveyor 11.

Figure 1:
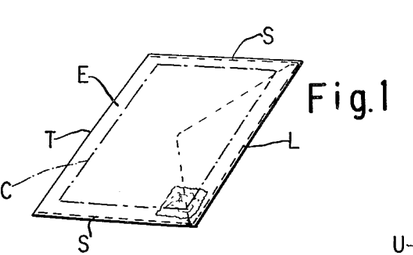
FIG. 1 is a perspective view of an envelope which is to be opened by a machine embodying the invention.

Each envelope has its leading edge trimmed therefrom by a cross-cutting device 15 disposed at a first cutting station located in the portion of the path of travel defined by conveyor 11, and thereafter the side edges of each envelope are simultaneously trimmed from the latter by a side cutting unit disposed at a second cutting station and including two side cutting devices 16 located at opposite sides of the portion of the rectilinear path of travel defined by the second conveyor 12. Thus, the machine 10 operates to cut each envelope E (FIG. 1) along its leading edge and opposite side edges, as indicated by the broken lines L and S, respectively, so that the envelope then consists of upper and bottom leaves joined together only along the trailing edge T and having the contents of the envelope therebetween.

Figure 2:
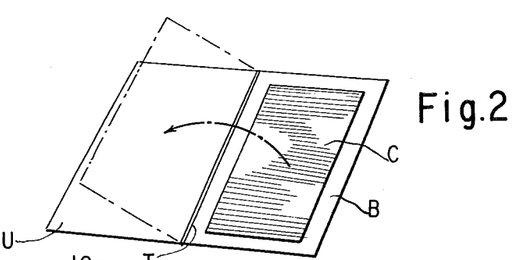
FIG. 2 is a perspective view of an envelope which has been opened by the machine embodying the invention.

Referring again to FIG. 3, it will be seen that after the leading and opposite side edges have been trimmed from each envelope by cutting devices 15 and 16, conveyor 13 further transports the envelope in the rectilinear path under an unfolding device 17 which acts upon the upper leaf U of each envelope so as to lay back the upper leaf about the trailing edge of the envelope into the plane of the bottom leaf B, thereby completely exposing the contents C on bottom leaf B for easy removal from the unfolded envelope, as illustrated in FIG. 2.

After each envelope has been cut and unfolded, as generally described above, so as to completely expose the contents of the envelope, the latter may be further transported by conveyor means (not shown) to suitable work stations at which the contents are removed from each opened envelope for further processing, for example, sorting and filing thereof.

Referring now to FIGS. 8a, 8b, 9a, 9b and 9c, it will be seen that the illustrated envelope opening machine 10 includes elongated side frame members 18 and 19 held in parallel spaced apart relation by end frame members 20 and 21. The first conveyor 11 is made up of a pair of endless main conveyor belts 22 running around pulleys 23 and 24 mounted on shafts 25 and 26, respectively. Shafts 25 and 26 extend laterally at locations spaced apart along side frame members 18 and 19 and have their opposite ends journalled in bearings supported by the side frame members, with both shafts 25 and 26 being disposed at the same level so that the upper runs of main conveyor belts 22 lie in a horizontal plane and extend closely adjacent to the side frame members 18 and 19 so as to flank the initial portion of the path of travel of the envelopes. Elongated bars 27 having their opposite ends secured to conveyor belts 22, as at 28, extend laterally between belts 22 at spaced apart locations along the latter and are provided with pushers 29 projecting from the trailing longitudinal edge of each bar 27 so as to extend upwardly into the path of travel of the envelopes when the related bar 27 is moving along the upper runs of belts 22.

The first conveyor 11 further includes auxiliary conveyor belts 30 disposed immediately inside of belts 22 and running around pulleys 31 mounted on shaft 26 and pulleys 32 mounted on a shaft 33 extending laterally at a location between shafts 25 and 26 and having its opposite ends journalled in bearings carried by side frame members 18 and 19. Support bars 34 having their opposite ends secured to auxiliary belts 30 extend laterally between such belts at suitably spaced apart locations so that, as each pusher carrying bar 27 moves along the path of travel of the envelopes, it is preceded, at a suitable distance, by a support bar 34. It is intended that each envelope be supported by a bar 27 and a preceding bar 34 while the pushers 29 engages the trailing edge of the envelope to propel the latter in the path of travel flanked by the upper runs of conveyor belts 22 and 30.

Figure 8A:
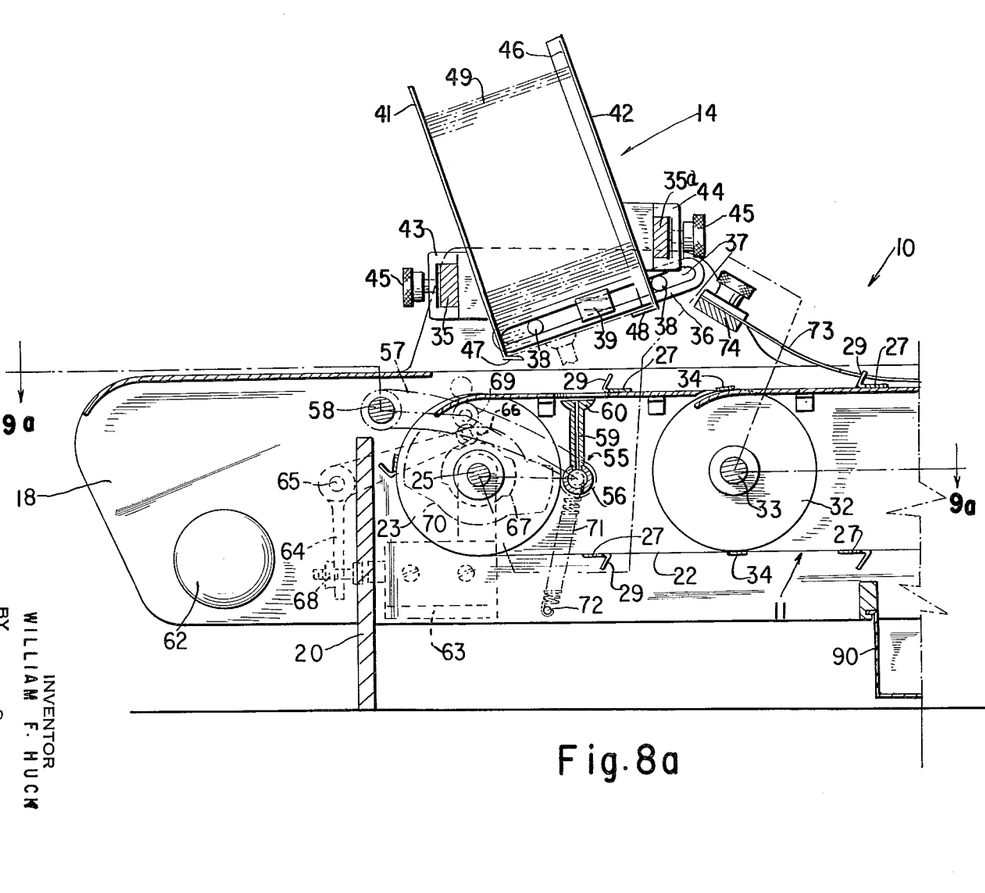
FIGS. 8a and 8b, taken together, are a side elevational view of an envelope opening machine embodying the invention, but with a side frame member being removed therefrom to better expose the components thereof.
Figure 9A:
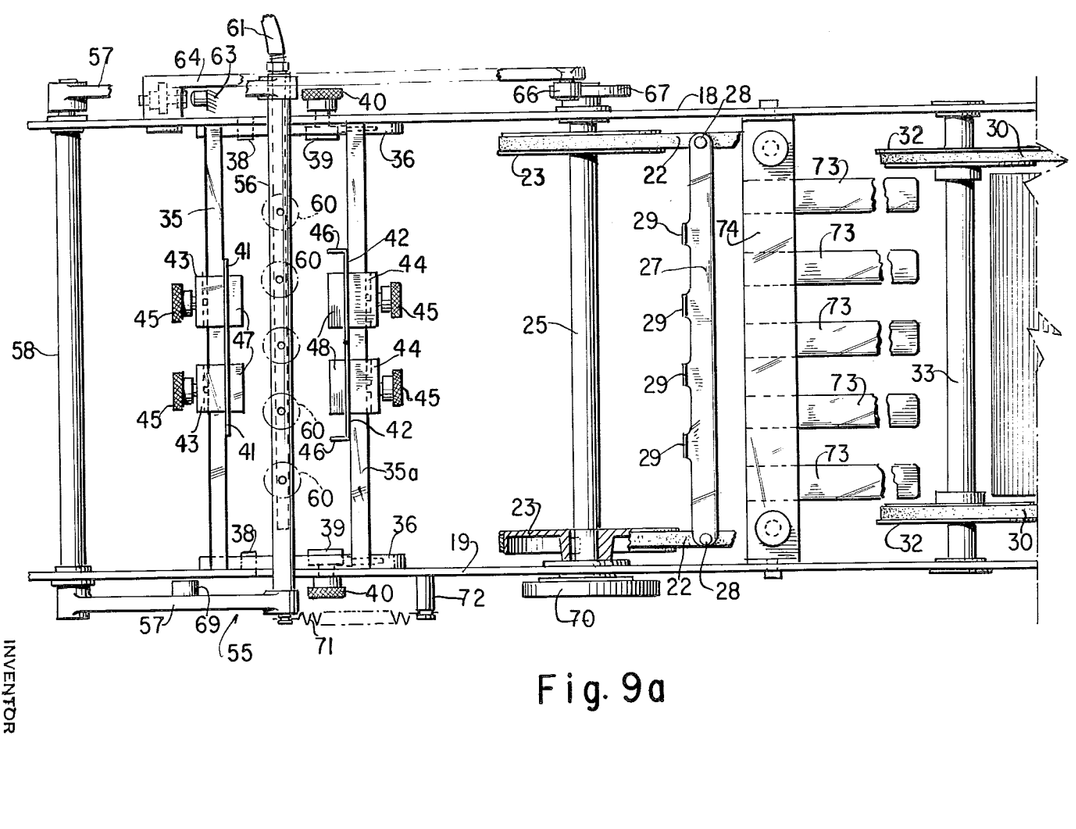
FIGS. 9a and 9b, taken together, comprise an extended sectional view taken along the line 9a–9b on FIGS. 8a and 8b.

As shown particularly in FIGS. 8a and 9a, the magazine 14 intended to hold a stack of envelopes for delivery to the first conveyor 11 may include a fixed cross member 35 secured, at its opposite ends, to upwardly extending portions of side frame members 18 and 19, and a movable cross member 35a having its opposite ends fastened to brackets 36 which are disposed against the inner surfaces of the upwardly projecting portions of the side frame members. Each bracket 36 is formed with an elongated slot 37 slidably receiving pin 38 projecting inwardly from the adjacent side frame member 18 or 19, and is adjustably secured relative to the adjacent side frame member by means of a T-shaped wedge 39 which is also slidably received in the slot 37 and which is clamped within the latter by means of a related hand screw 40 extending through a tapped hole in the adjacent side frame member. When screws 40 are loosened, brackets 36 can be adjusted to vary the distance between cross members 35 and 35a.

Magazine 14 further includes pairs of upstanding slat members 41 and 42 respectively defining the front and back of the magazine and being secured, adjacent their lower ends, to clamp members 43 and 44 which are slidable laterally on cross members 35 and 35a, respectively. Clamp members 43 and 44 are each provided with a hand screw 45 that can be tightened against the cross member 35 or 35a for holding the related upstanding slat member 41 or 42 in its laterally adjusted position. The slat members 42 each have a flange 46 extending along the outer edge thereof and directed toward the slat members 41. Further, ledges 47 and 48 directed towards each other are provided at the lower ends of slat members 41 and 42, respectively, so that, when a stack of envelopes is inserted in magazine 14, as at 49 on FIG. 8a, the lowermost envelope of the stack is releasably supported at two opposed edges thereof on the ledges 47 and 48.

It will be apparent that the stack of envelopes 49 in magazine 14 is guided, at the front and back, by upstanding slat members 41 and 42, and, at the opposite sides, by the flanges 46 on members 42. Further, it will be apparent that envelopes of different sizes can be accommodated in magazine 14 by adjusting cross member 35a relative to fixed cross member 35 and by adjusting members 41 and 42 laterally along cross members 35 and 35a, as previously described herein.

Figures 17, 18, 19, 20A, 20B, 21:
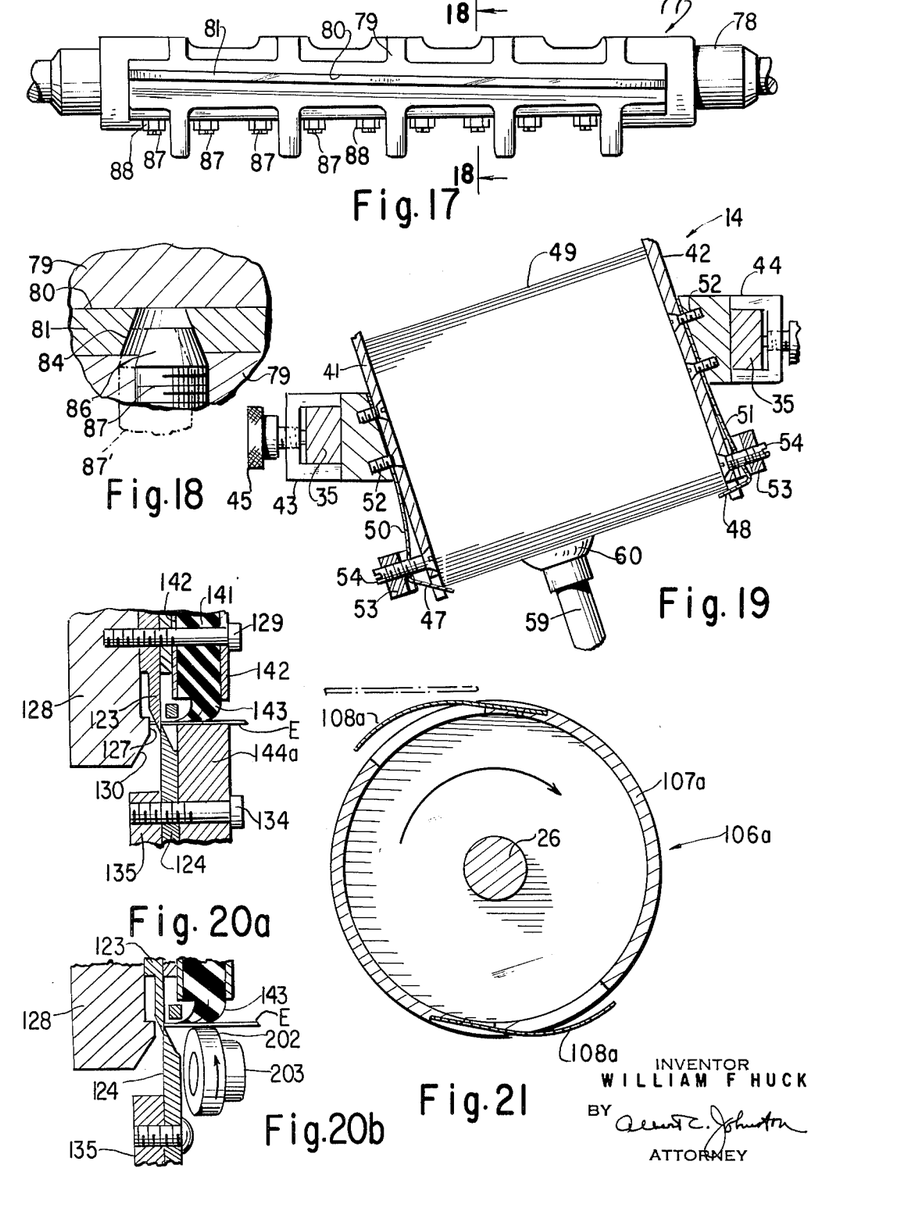
FIG. 17 is an enlarged view of the rotor and movable blade carried thereby in the cross-cutting device as seen when viewed along the line 17—17 on FIG. 8b.
FIG. 18 is an enlarged sectional view taken along the line 18—18 on FIG. 17.
FIG. 19 is a fragmentary sectional view of the lower portion of a preferred form of magazine included in the envelope opening machine.
FIG. 20a is a fragmentary sectional view showing a modification of means provided in the side cutting devices of FIG. 10 for ensuring accurate maintenance of the width of material removed from the side edges of each envelope.
FIG. 20b is a similar view of another modification thereof.
FIG. 21 is a sectional view showing a modification of the lifting means appearing in FIG. 12 for raising each envelope between first and second conveyors included in the illustrated envelope opening machine.

As shown in FIG. 19, the ledges 47 and 48 for supporting the stack of envelopes 49 in magazine 14 preferably are defined by the bent lower ends of spring strips 50 and 51 secured, adjacent their upper ends, to members 41 and 42, respectively, as by screws 52 and being bowed so as to tend to withdraw the bent lower ends 47 and 48 from under the bottom of stack 49. The bent, ledge defining lower ends 47 and 48 of spring strips 50 and 51 are adjustably projected under stack 49 by means of C-shaped nuts 53 which embrace the lower end portions of spring strips 50 and 51 and are threaded on adjustment screws 54 extending rotatably through the lower ends of members 41 and 42. Obviously, screws 54 can be turned to move nuts 53 toward and away from the adjacent members 41 and 42, thereby to project the ledges 47 and 48 a larger or smaller distance, respectively, under stack 49.

Envelope opening machine 10 has a delivery mechanism 55 (FIGS. 8a and 9a) disposed under magazine 14 and operative in synchronism with the movements of conveyor 11 to remove the lowermost envelope from the stack 49 in magazine 14 and to deposit such envelope on a pusher carrying bar 27 and a support bar 34 of conveyor 11 for movement from under the magazine by pushers 29. The delivery mechanism 55 includes a laterally extending tube 56 supported, at its opposite ends, by arms 57 extending radially from the opposite ends of an axle 58 journalled in bearings carried by side frame members 18 and 19. Suction tubes 59 extend upwardly from tube 56 at locations spaced apart along the latter and terminate in cups 60. One end of tube 56 is connected, as by a flexible hose 61, with a suitable source of vacuum, for example, the inlet of a motor driven suction pump 62, so that tube 56 acts as a suction manifold for the several suction tubes 59. Preferably, a valve 63 is interposed in the connection between tube 56 and the source of vacuum and is actuated so as to apply vacuum to the tubes 59 only during a predetermined portion of cyclic rocking movements imparted to arms 57, as hereinafter described in detail. Such actuation of valve 63 may be achieved by a bell crank 64 rockably mounted, as at 65, on side frame member 18 and having a cam following roller 66 at one end engageable with a radial cam 67 adjustably secured on shaft 25, while the other end of bell crank 64 carries an adjustable screw 68 engageable with a plunger of valve 63 to connect tube 56 with the source of vacuum by way of valve 63 only when roller 66 rides on a radially enlarged portion of cam 67.

In order to effect cyclic movement of suction tubes 59 toward and away from the bottom of the stack 49 in magazine 14, one of arms 57 carries a cam follower roller 69 engageable with the periphery of a radial cam 70 which is also secured on shaft 25, and a spring 71 is connected between an end of tube 56 and an anchor 72 projecting from the adjacent side frame member 19 to urge tube 56 downwardly and thereby maintain roller 69 in engagement with cam 70. Cams 67 and 70 are shaped and positioned relative to each other so that, when tube 56 is raised to contact the suction cups 60 with the lowermost envelope in stack 49, tube 56 is in communication with the source of vacuum to cause adherence of the contacted envelope to the suction cups, and communication with the source of vacuum is maintained as tube 56 is displaced downwardly to the position shown in full lines on FIG. 8a, where suction cups 60 are disposed below the plane of the upper runs of conveyor belts 22, at which time, the communication of tube 56 with the source of vacuum is interrupted by valve 63 to release the envelope thus delivered onto the conveyor 11. Further, cam 70 which controls the rocking of arms 57 is shaped and positioned on shaft 25 so that an envelope is delivered from magazine 14 onto conveyor 11 in advance of each of the lateral bars 27 carrying the pushers 29, whereby each envelope delivered to conveyor 11 from magazine 14 is transported from under the latter on a bar 27 and a support bar 34 in advance of the latter.

Figure 8B:
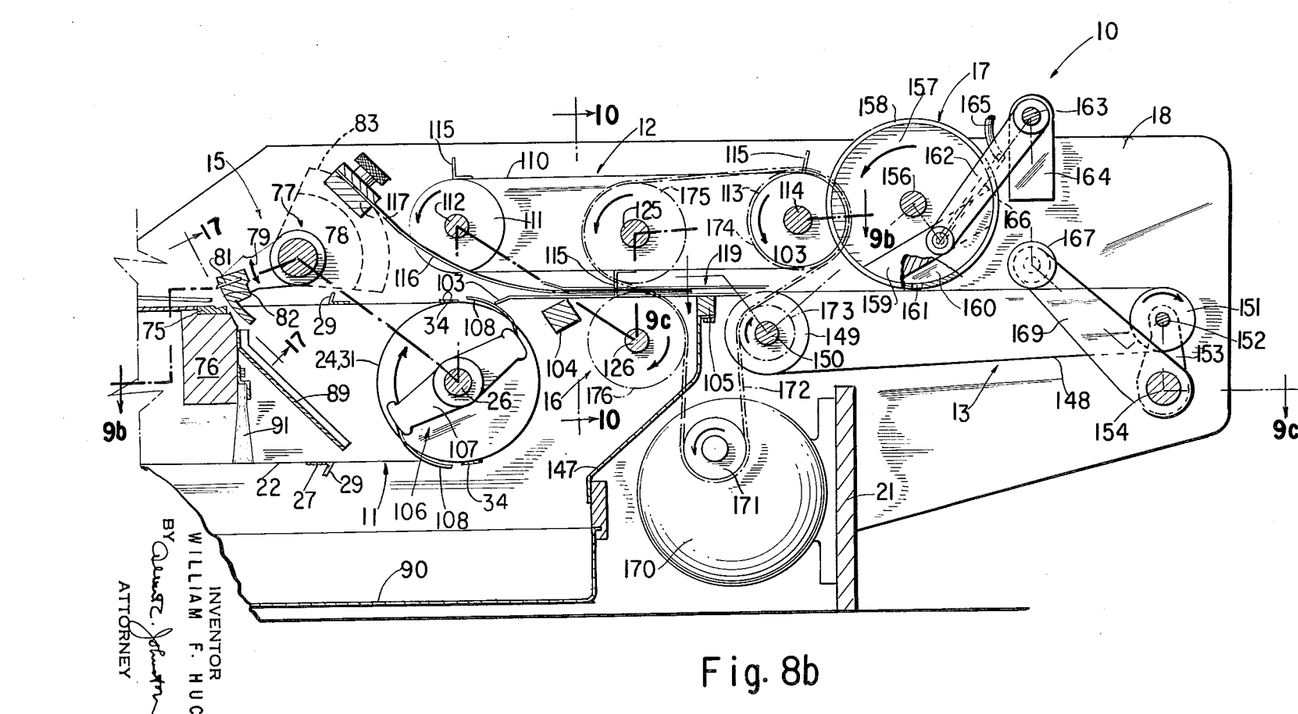
Figure 9B:
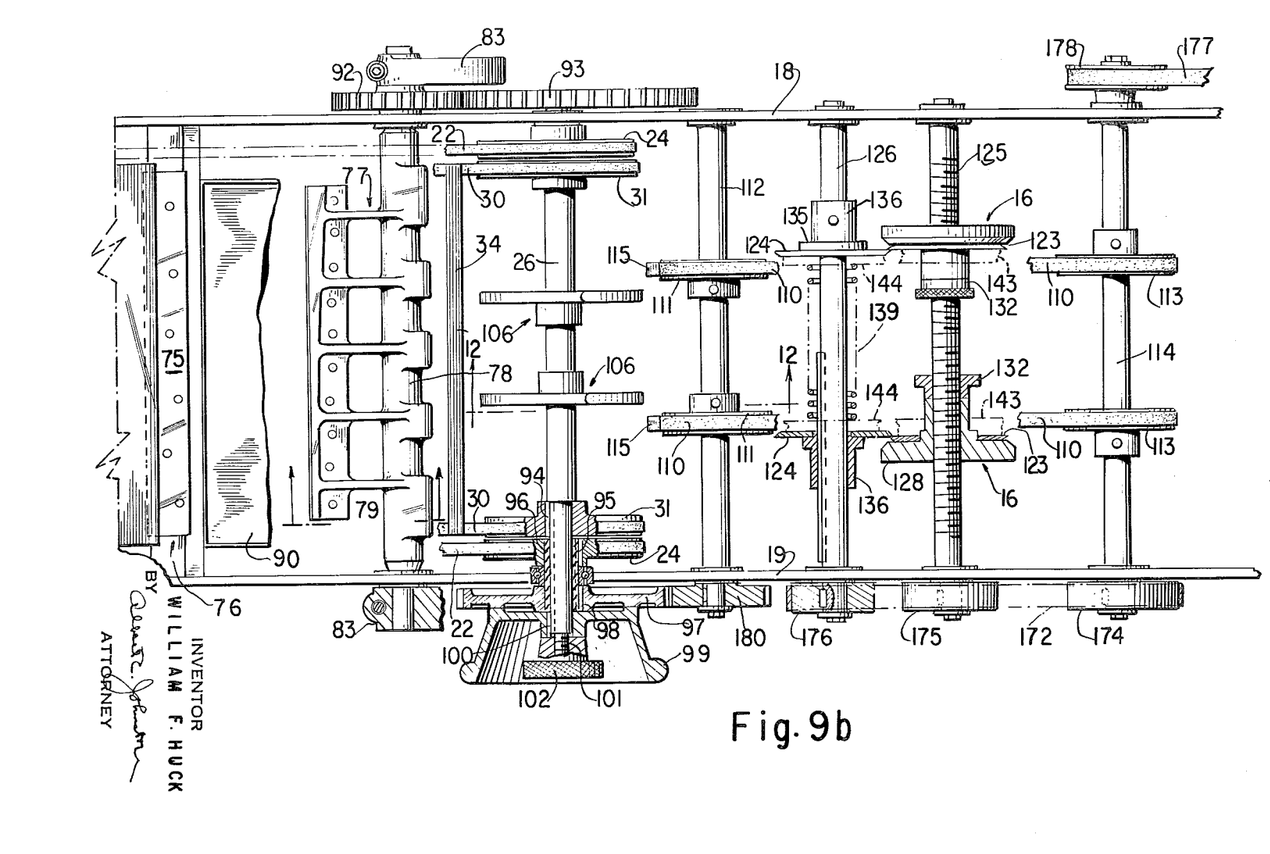

Referring now to FIGS. 8b and 9b, it will be seen that the cross cutting device 15 generally includes a fixed blade 75 extending laterally between the upper runs of the inner auxiliary conveyor belts 30 immediately below the path of travel of the successive envelopes transported by conveyor 11 and being disposed at a location intermediate the shafts 26 and 33 of that conveyor. The fixed blade 75 is carried by a supporting bar 76 having its opposite ends suitably secured to side frame member 18 and 19.

The cross cutting device 15 further includes a rotor 77 (FIGS. 8b, 9b and 17) having a shaft portion 78 extending laterally above the path of travel of the envelopes transported by conveyor 11 with its opposite ends journalled in suitable bearings carried by portions of side frame members 18 and 19 which extend above the path of travel of the envelopes. A blade carrying structure 79 of the relatively small angular extent projects radially from shaft portion 78 and has a slot 80 extending along its outer portion generally parallel to the axis of rotation of rotor 77 and opening radially outward to receive a movable blade 81. The outer portion of blade carrying structure 79 has an arcuate surface 82 lying ahead of the blade 81 in the direction of rotation of rotor 77, and the blade 81 is radially positioned within the slot 80, as hereinafter described in detail, so that its cutting edge projects a small radial distance $d$ (FIG. 4) beyond arcuate surface 82 which constitutes an abutment surface.

Figures 13, 14, 16:
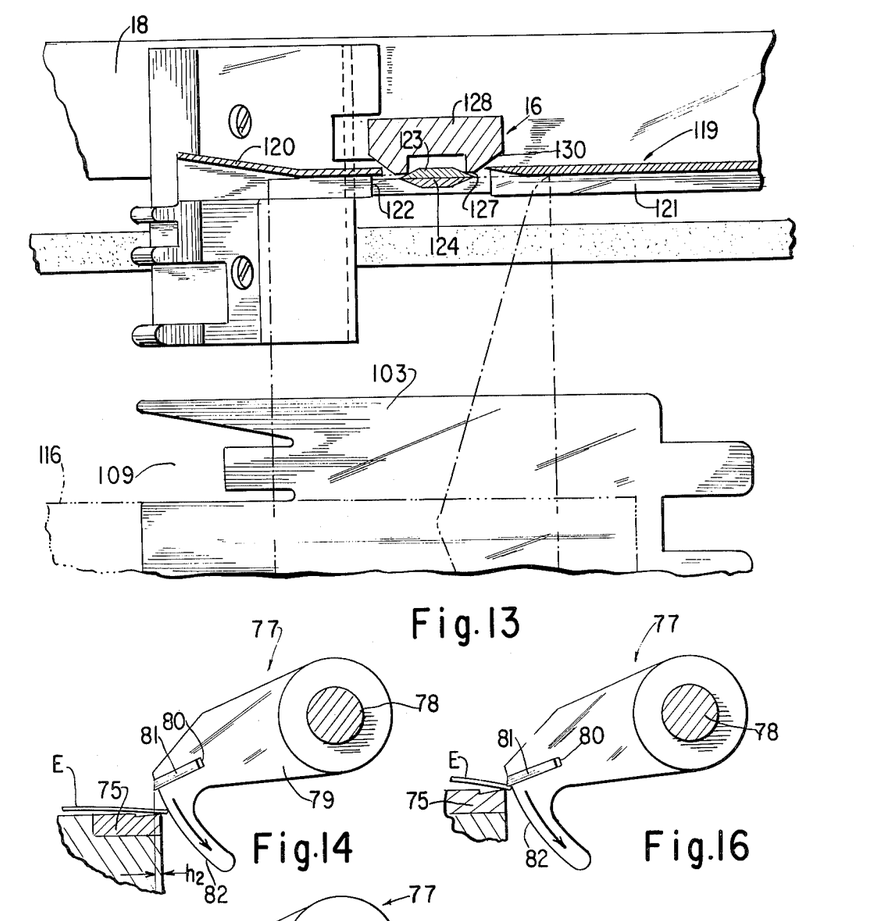
FIG. 13 is a horizontal sectional view taken along line 13—13 on FIG. 12.
FIGS. 14, 15 and 16 are enlarged detail sectional views further illustrating the operation of a cross-cutting device included in the envelope opening machine.

The axis of rotation of rotor 77 is located with respect to support bar 76 carrying fixed blade 75 so that, when rotor 77 is rotated in the counter-clockwise direction, as viewed in FIGS. 3, 4, 5 and 8b, the cutting edge of movable blade 81 passes generally downwardly closely adjacent to the cutting edge of fixed blade 75 to trim or shear off the leading edge of an envelope, as illustrated in FIGS. 5 and 16. Further, the opposite ends of the shaft 78 of rotor 77 project outwardly beyond side frame members 18 and 19 and carry counterweights 83 which extend generally in diametrically opposed directions to blade carrying structure 79 for dynamically balancing rotor 77.

Rotor 77 is rotatably driven, as hereinafter described in detail, in synchronism with the movement of conveyor 11 so that an envelope E propelled by pushers 29 of conveyor 11 has its leading edge initially moved into contact with the arcuate abutment surface 82 of rotor 77 while movable blade 81 is still disposed a substantial distance above fixed blade 75. Thus, during the movement of blade 81 from such position (FIG. 14) to the cutting or shearing position (FIG. 16), pushers 29 continue to act upon the trailing edge of envelope E to bow the latter upwardly, as is clearly apparent in FIG. 5, and thereby ensure that, at the instant of cutting, the leading edge of the envelope securely contacts abutment surface 82 whereby the width of material trimmed or sheared from the leading edge of the envelope is precisely equal to the radial distance $d$ between the cutting edge of movable blade 81 and arcuate abutment surface 82. By reason of the described bowing of the envelope prior to trimming off of its leading edge, the predetermined width of material is removed from each envelope even though the dimensions of successive envelopes may vary within the usual tolerances. Such variations in the dimensions of the successive envelopes merely alter the degree of upward bowing thereof which, in any case, is sufficient to ensure the desired initial contact of the leading edge of each envelope with abutment surface 82 prior to shearing thereof by blades 75 and 81.

Figure 15:
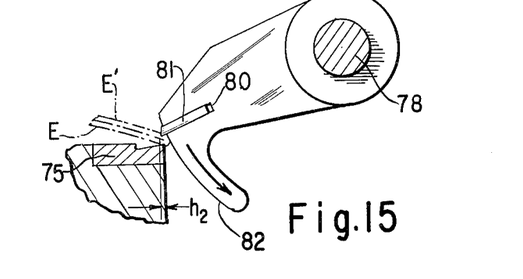

As is apparent in FIGS. 14, 15, and 16 the disposition of the axis of rotation of rotor 77 substantially above the path of the conveyed envelopes, and hence substantially above fixed blade 75, causes movement of the cutting edge of blade 81 in a substantially inclined direction past the cutting edge of fixed blade 75. Thus, when blade 81 is above blade 75, there is a substantial horizontal overlap of the cutting edges of blades 75 and 81, indicated at $h_2$ on FIG. 14, and this overlap progressively decreases as blade 81 moves downwardly toward blade 75. As indicated in FIG. 16, blades 75 and 81 are adjustably positioned in their respective carrying structures so that, when a single envelope E is presented at the first cutting station for trimming off of its leading edge by the cross cutting device 15, the horizontal overlap of the cutting edges of blades 75 and 81 has been completely eliminated at the instant when the cutting edge of movable blade 81 contacts the top surface of the single envelope adjacent the leading edge of the latter. However, if two envelopes E and E' (FIG. 15) are inadvertently simultaneously presented at the first cutting station, the increased thickness of the two or more envelopes results in initial contact of the cutting edge of movable blade 81 with the top surface of the uppermost envelope E' while there is still a substantial horizontal overlap $h_2$ of the cutting edge of blade 81 with respect to the cutting edge of fixed blade 75, so that the thickness of two or more envelopes is jammed between the overlapped cutting edges of blades 75 and 81, rather than being sheared thereby, and the drive of the envelope opening machine 10 is arranged, as hereinafter described in detail, so as to automatically halt operation of the machine upon the occurrence of such jamming.

The disposition of the axis of rotation of rotor 77 above the path of travel of the envelopes transported by conveyor 11 and the small angular extent of the rotor are further advantageous in that rotor 77 moves downwardly and then upwardly through such path of travel in advance of each conveyed envelope only during a portion of each revolution of the rotor and is completely removed from the path of travel of the conveyed envelope during the remainder of the revolution, thereby to avoid any interference with the further travel of the envelope in its rectilinear path following trimming off of the leading edge of the envelope.

In order to effect radial adjustment of blade 81 within slot 80 of rotor 77, which radial adjustment varies the distance $d$ (FIG. 4) determining the width of material trimmed from the leading edge of each envelope, blade 81 is provided with a laterally aligned series of tapered holes 84 extending therethrough, and each tapered hole 84 receives the similarly tapered tip 85 of a set screw engaged in a tapped hole of the blade supporting structure 79. The tapered holes 84 in blade 81 are oversize with respect to the set screws 87, and the adjacent set screws are offset relative to each other in the radial direction of rotor 77, as indicated at 87 and 87' on FIG. 18, so that the tapered tips 86 of the adjacent set screws engage diametrically opposed sides of the related tapered holes 84. Accordingly, blade 81 can be moved radially inward or outward by increasing and decreasing the penetration into holes 84 of the tapered tips of the alternately arranged set screws 87. As seen in FIG. 17, lock nuts 88 are provided on set screws 87 to prevent inadvertent turning of the latter with consequent alteration of the radial position of blade 81 relative to rotor 77. The fixed blade 75 is similarly adjustably positioned relative to its support bar 76 so that, when blade 81 is moved radially outward or inward in slot 80 for respectively increasing or decreasing the width of material trimmed from the leading edge of each envelope, blade 75 may be correspondingly adjusted for maintaining the desired positional relationship between the cutting edges of blades 75 and 81 for shearing of the envelope material.

As shown in FIG. 8b, the material trimmed from the leading edge of each envelope by cross cutting device 15 falls downwardly along an inclined guide 89 suitably secured to support bar 76 and is collected in a drawer 90 which is removably mounted in a suitable manner at the bottom of machine 10 so that it may be conveniently withdrawn for removal of the cut material therefrom and then reinserted in its illustrated position. Support bar 76 further carries a laterally extending, downwardly directed brush 91 which contacts the lower runs of conveyor belts 22 and 30 for removing the cut material therefrom so that such material cannot build up on the conveyor belts and possibly cause clogging of the machine.

In order to permit cross cutting device 15 to trim the leading edges from envelopes having different dimensions measured between the leading and trailing edges thereof, rotor 77 and conveyor 11 have synchronous drives arranged to permit adjustment of the positional relationship between the pushers 29 carried by main conveyor belts 22 and rotor 77, while maintaining the original positional relationship between support bars 34 carried by auxiliary conveyor belts 30 and the rotor of cross cutting device 15 so as to prevent interference between rotor 77 and such support bars. More specifically, as shown in FIG. 9b, rotor 77 is driven from shaft 26 through a spur gear 92 fixed on one end of shaft 78 of rotor 77 and meshing with a spur gear 93 fixed on the adjacent end of shaft 26. Pulleys 31 carrying conveyor belts 30 are fixed to shaft 26, as by keys 94 so that the support bars 34 carried by belts 30 are maintained in a predetermined positional relationship with respect to rotor 77, that is, movable blade 81 carried by rotor 77 always moves downwardly past fixed blade 75 as a support bar 34 approaches the position of the fixed blade and is at a predetermined distance from the latter.

The pulley 24 carrying the main conveyor belt 22 adjacent to side frame member 18 is freely rotatable on shaft 26, while both pulleys 23 on shaft 25 are rotatably fixed to the latter so that shaft 25 and the main conveyor belt 22 adjacent side frame member 18 are both driven through the other main conveyor belt 22 adjacent side frame member 19. The pulley 24 carrying the belt 22 adjacent side frame member 19 is fixed, as by a key 95, to a sleeve 96 mounted on shaft 26 within the bearing for the latter and being turnable with respect to shaft 26. Sleeve 96 projects axially outward beyond side frame member 19 and has a drive gear 97 secured thereon, as by a key 98. Shaft 26 projects axially out of sleeve 96 and has a hand wheel 99 rotatably connected therewith, as by a key 100, and the end of shaft 26 has a threaded extension 101 receiving a lock nut 102 by which hand wheel 99 is axially clamped against gear 97.

When hand wheel 99 is axially clamped or secured to gear 97, rotation of gear 97 is transmitted to shaft 26 through hand wheel 99, thereby to directly rotate pulleys 31 and to rotate rotor 77 through gears 92 and 93, while the pulley 24 adjacent side frame member 19 is rotated with gear 97 through sleeve 96 to drive the belt 22 running therearound, and through such belt, to drive the related pulley 23 on shaft 25. When lock nut 102 is loosened, hand wheel 99 and shaft 26 may be manually turned relative to gear 97, thereby simultaneously adjusting the positional relationship of support bars 34 and rotor 77 with respect to the bars 27 carrying pushers 29 for accommodating envelopes of different sizes on conveyor 11. Since shaft 25 is driven from the pulley 24 on sleeve 96, it will be apparent that adjustment of the positional relationship of the pusher carrying bars 27 relative to rotor 77 and support bars 34 is accompanied by corresponding adjustment of the positional relationship of cams 67 and 70 controlling the operation of the mechanism 55 by which the successive envelopes are delivered from magazine 14 to conveyor 11, so that such delivery mechanism remains timed to operate in synchronism with the movement of pushers 29.

Conveyor 11 transports the successive envelopes from cross-cutting device 15 onto a horizontal stationary guide plate or surface 103 extending longitudinally from the delivery end of conveyor 11 and disposed at a level above that of the upper runs of belts 22 and 30 of conveyor 11. Guide surface 103 is mounted on the central portions of laterally extending bars 104 and 105 (FIG. 8b) having their opposite ends suitably secured to side frame members 18 and 19.

Figure 12:
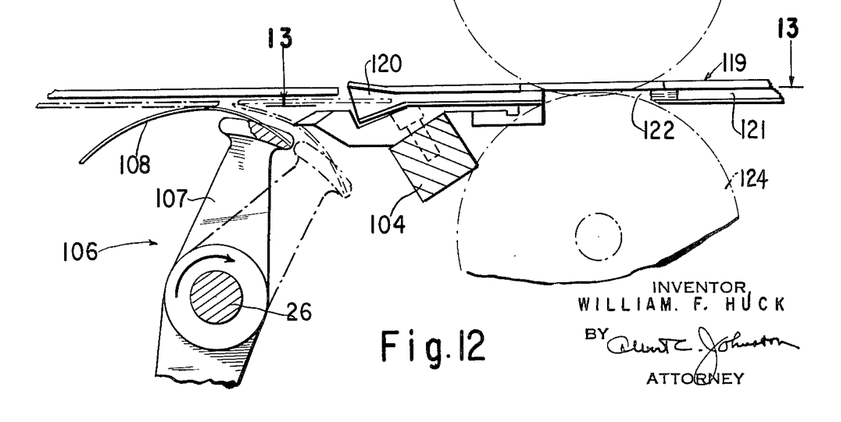
FIG. 12 is an enlarged detail sectional view taken along the line 12—12 on FIG. 9b.

In order to lift each envelope from conveyor 11 onto the relatively higher guide surface 103, a lifting device 106 (FIGS. 9b and 12) is mounted on shaft 26 at the central portion of the latter. The lifting device may include diametrically extending arms 107 secured on shaft 26 for rotation with the latter and arcuate, resilient lifting fingers 108 secured to the ends of each arm 107 and extending generally circumferentially therefrom in the direction opposed to the rotation of shaft 26. The diametrical dimension of each arm 107, that is, the distance between the ends thereof, is substantially smaller than the diameter of each of the pulleys 24 and 31 on shaft 26 so that, as the arms 107 rotate with shaft 26, the ends of arms 107 do not contact the undersides of the envelopes transported by conveyor 11. However, each arcuate resilient finger 108 is shaped so that the radial distance from the finger to the axis of shaft 26 progressively increases in the direction toward the free end of finger 108, at which point the radial distance to the axis of shaft 26 is substantially larger than the vertical distance from the axis of shaft 26 to the horizontal plane of the path of travel of the envelopes on conveyor 11. Thus, as arms 107 rotate with shaft 26, fingers 108 are progressively projected upwardly above the horizontal plane of the upper runs of belts 22 and 30, and arms 107 are angularly positioned on shaft 26 so that fingers 108 thus project upwardly immediately in back of each support bar 34 of conveyor 11, thereby to raise each conveyed envelope onto guide surface 103.

Since the rapid rotation of arms 107 of lifting device 106 may produce air currents acting on the successive envelopes to adversely affect the positioning of the latter during delivery of the envelopes from conveyor 11 onto guide surface 103, the above described lifting device 106 may be replaced by the modified lifting device 106a shown in FIG. 21 and in which, in place of the arms, there is provided a cylinder 107a fixed on the central portion of shaft 26 for rotation with the latter. Arcuate resilient lifting fingers 108a are disposed at diametrically opposed locations on the surface of cylinder 107a and are each secured, at one end, to the cylinder to extend generally circumferentially from the latter in the direction opposed to the rotation of shaft 26. The relatively smooth surface cylinder 107a supporting the lifting fingers 108a makes it possible to rapidly rotate the same without creating strong air currents that can adversely affect the positioning of the conveyed envelopes.

The end of guide surface 103 adjacent conveyor 11 preferably has suitably located cutouts 109 (FIGS. 9c and 13) through which the lifting fingers 108 or 108a may pass during the delivery of each envelope onto surface 103.

Each envelope delivered onto guide surface 103 by conveyor 11 is further transported on surface 103 by the second conveyor 12 which includes endless conveyor belts 110 running around pulleys 111 that are rotatable with, and axially adjustable along a laterally extending shaft 112 disposed vertically above shaft 26 and having its opposite ends journalled in bearings carried by side frame members 18 and 19 (FIGS. 8b and 9b). Belts 110 of conveyor 12 further run around pulleys 113 that are rotatable with, and axially adjustable along a laterally extending shaft 114 having its opposite ends journalled in bearings carried by side frame members 18 and 19 and being spaced substantially from shaft 112 in the direction away from conveyor 11. Shafts 112 and 114 have their axes disposed in the same horizontal plane which is spaced upwardly from guide surface 103 sufficiently so that the lower runs of conveyor belts 110 move in a horizontal plane spaced upwardly from guide surface 103. The conveyor belts 110 carry pushers 115 which depend therefrom and extend below the level of guide surface 103 during movement of the pushers along the lower runs of belts 110. Pulleys 111 and 113 are axially adjusted along their respective shafts 112 and 114 so that the paths of the conveyor belts 110 are disposed laterally outward with respect to the opposite side edges of guiding surface 103 and laterally inward with respect to the side edges of each envelope to be transported by conveyor 12. Further, pushers 115 are located along belts 110, and the latter are driven in synchronism with the movements of conveyor 11, as hereinafter described in detail, so that pushers 115 reach the bottom of the related pulleys 111 and commence their movement along the lower runs of conveyor belts 110 as pushers 29 on a bar 27 arrive immediately above the axis of shaft 26, that is, at the end of the upper runs of conveyor belts 22 carrying the bars 27. Pushers 115 extend a distance from belts 110 which is smaller than the vertical distance between the lower runs of belts 110 and the upper runs of belts 22, thereby to avoid interference between pushers 115 and bars 27, while the lifting device 106 or 106a which lifts each envelope onto the relatively raised guide surface 103 thereby raises the envelope into the path of travel of pushers 115 depending from the lower runs of conveyor belts 110. Thus, each envelope delivered by conveyor 11 with its leading edge trimmed therefrom is engaged, at its trailing edge, by pushers 115 of the second conveyor 12 and thereby further transported in the rectilinear path of travel of the envelopes.

A resilient hold-down finger 116 (FIG. 8b) extends from a lateral mounting bar 117 secured at its opposite ends to side frame members 18 and 19 and bears downwardly on each envelope as the latter is transported along guide surface 103 by pushers 115.

Figure 10:
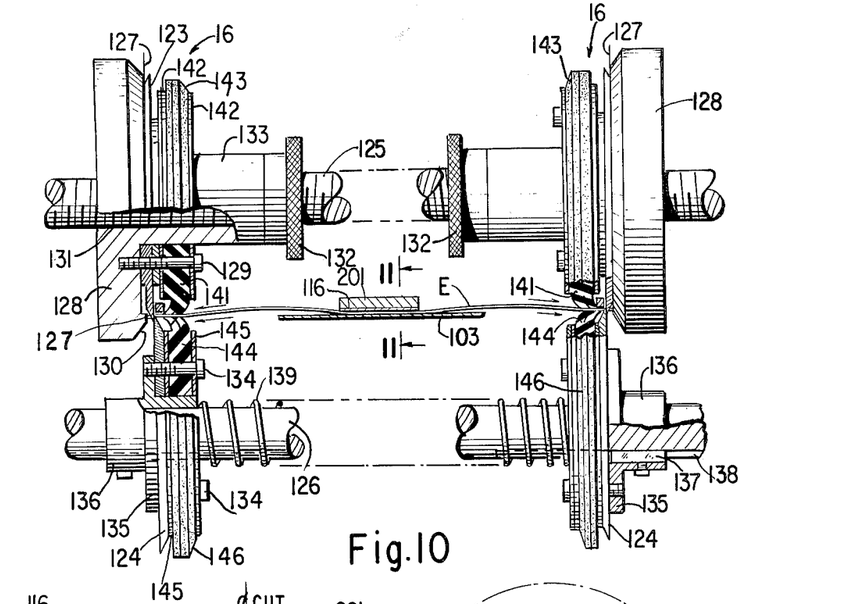
FIG. 10 is an enlarged, transverse sectional view taken along the line 10—10 on FIG. 8b and showing details of the structure of side cutting devices including in the envelope opening machine.
Figure 11:
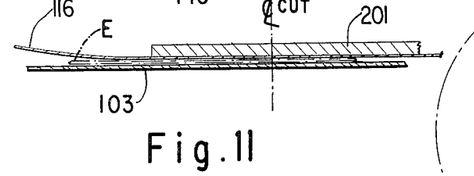
FIG. 11 is a detail sectional view taken along the line 11—11 on FIG. 10.

The finger 116 is located centrally along the path of the envelope and extends therealong over surface 103 through and beyond the zone of action of the side cutting devices 16. As shown in FIGS. 10 and 11, it carries a bar or weight 201 of sufficient mass to hold the central portion of the moving envelope flat against the surface 103, while leaving portions of the envelope between the finger 116 and the side cutting devices free to be bulged or bowed upwardly in a doubly bowed pattern, as indicated schematically in FIG. 10.

Further, side guides 119 (FIGS. 8b and 13) are arranged along the opposite sides of the path followed by the successive envelopes during transport of the latter by conveyor 12 and are suitably supported on the laterally extending bars 104 and 105 for adjustment toward and away from each other so as to accommodate envelopes having different lateral dimensions therebetween. As shown particularly in FIG. 13, each side guide 119 has a flaring mouth or inlet 120 to receive the adjacent side edge portion of an envelope as the central part of the latter is lifted onto guide surface 103, and the inlet or mouth 120 extends into an inwardly opening channel or groove 121 extending longitudinally along the side guide 119. Each side guide 119 is cut away, as at 122, at the location of the second cutting station so that side cutting devices 16, which are hereinafter described in detail, can act through the cutouts 122 of side guides 119 to trim the side edges from each envelope as the latter is transported by conveyor 12 with its side edge portions being closely guided in guides 119.

Since a predetermined width of material is trimmed from each side edge of the envelope by the side cutting devices 16, it will be noted that the inside surface of groove 121 is disposed further inward at the portion of the groove or channel following cutout 122 than at the portion of groove or channel 121 in advance of cutout 122, whereby the side edges of each envelope are closely contacted by the side walls of grooves or channels 121 both before and after the removal of material from the side edges by the related side cutting devices 16. Such close contact of the side wall surface of channel 121 with the adjacent side edge of each envelope is effective to maintain the latter with its side edges extending exactly parallel to the direction of movement of the conveyed envelope, and thereby ensures that a uniform width of material will be removed from each side edge of the envelope between the leading and trailing edges of the latter.

As shown particularly in FIGS. 9b and 10, each of the side cutting devices 16 includes upper and lower circular cutting blades 123 and 124, respectively, having peripheral cutting edges and being mounted on upper and lower shafts 125 and 126 which extend laterally above and below guide surface 103 and have their opposite ends journalled in bearings carried by side frame members 18 and 19. The blades 123 and 124 of each cutting device 16 are arranged on the respective shafts so that their peripheral cutting edges lie in a common vertical plane extending parallel to the direction of movement of the envelopes, and the axes of shafts 125 and 126 are spaced apart vertically in relation to the diameters of the cutting blades so that the peripheral cutting edges of the latter overlap vertically substantially at the plane of the path of travel of the conveyed envelopes defined by guide surface 103. Thus, cutting blades 123 and 124 of each cutting device 16 are operative to shear each envelope along the adjacent side edge of the latter as the envelope passes through the second cutting station at which the side cutting devices 16 are located.

In order to precisely control the width of material removed from each side edge of an envelope, the upper blade 123 of each cutting device 16, which is disposed at the outside of the related lower cutting blade 124, is mounted for rotation with its cutting edge maintained at a fixed axial distance inwardly from an abutment surface 127. The surface 127 is engaged by the adjacent side edge of an envelope during the side cutting operation so that the width of material removed from the side edge of the envelope will be precisely equal to the axial distance between the cutting edge and the abutment surface. In each illustrated side cutting device 16, the abutment surface 127 is advantageously annular and generally radially directed and is defined on a mounting member 128 to which the associated upper blade 123 is fixedly secured, as by screws 129 so that the upper blade 123 and annular abutment surface 127 rotate together to avoid even slight variations in the axial distance between the abutment surface and the cutting edge of the associated upper blade. The outer periphery of annular abutment surface 127 is preferably bevelled, as at 130 (FIGS. 10, 13 and 20), to lead the adjacent side edge of a conveyed envelope from guide 119 against abutment surface 127.

In order to provide for lateral adjustment of side cutting devices 16 toward and away from each other, and thereby permit trimming of the side edges of envelopes having different lateral dimensions, the upper shaft 125 is threaded, as shown, while the mounting member 128 carrying the upper cutting blade 123 of each side cutting device has an axial threaded bore 131 (FIG. 10) receiving the threaded shaft 125. Thus, turning of each blade mounting member 128 relative to shaft 125 effects axial adjustment of the related upper blade 123 along the laterally extending shaft 125. Each upper blade 123 is held in its axially adjusted position by a lock nut 132 screwed on shaft 125 and adapted to be tightened axially against a hub 133 extending from the blade mounting member 128.

The lower blade 124 of each side cutting device 16 is secured, as by screws 134 to a radial flange 135 extending from a hub 136 which is slidable on the lower shaft 126. Each hub 136, and hence the lower blade 124 secured thereto, is made to rotate with lower shaft 126, for example, by a key 137 engaging in a slot 138 extending axially along shaft 126 (FIG. 10).

A helical spring 139 is provided on shaft 126 and abuts, at its opposite ends, against the hubs 136 carrying lower cutting blades 124 thereby to urge the latter axially apart so that the peripheral cutting edge portions of lower blades 124 are held against the peripheral cutting edge portions of the related upper blades 123 in all axially adjusted positions of the latter along upper shaft 125.

The upper blades 123 are preferably adjusted along shaft 125 to provide an axial distance between the associated abutment surfaces 127 that is substantially less than the lateral dimension of the envelope to be opened, so that each envelope E is bowed upwardly out of a flat plane during contact of its side edges with abutment surfaces 127, as shown in FIG. 10. Such upward bowing of the envelope ensures the reliable contact of its side edges with abutment surfaces 127 even when there are the usual variations in the lateral dimensions of the successive envelopes being opened, in that an envelope having a relatively smaller lateral dimension merely bows upwardly to a lesser extent than an envelope having a relatively larger lateral dimension.

In order to further ensure close contact of each side edge of an envelope with the adjacent abutment surface 127 as the side edge portion of the envelope passes between cutting blades 123 and 124, each of the side cutting devices 16 preferably also includes means acting on each side edge portion of the envelope to urge the same laterally outward toward the adjacent abutment surface 127 during the side cutting operation. As shown in FIG. 10, such means may include a resilient annular member 141 of rubber or the like mounted between a pair of stiffening discs 142 at the inside of the related upper cutting blade 123 on the hub 133 of the mounting member 128 and being secured to the latter by the screws 129. The resilient annular member 141 has a circumferentially split peripheral portion 143 projecting radially beyond the edges of discs 142 and being inclined from a radial plane in the direction toward the adjacent upper blade 123. A similar resilient annular member 144 is mounted on each hub 136 between stiffening discs 145 and is secured at the inside of the related lower cutting blade 124 by the screws 134 extending into flange 135. The lower resilient annular member 144 also has a peripheral portion 146 projecting radially beyond the edges of the stiffening discs 145 and being inclined from a radial plane in the direction toward the adjacent lower cutting blade. The resilient annular members 141 and 144 are diametrically dimensioned so that their peripheral portions 143 and 146 bear resiliently against the side edge portion of each envelope as the latter passes the second cutting station and, by reason of the above described inclination of the peripheral portions 143 and 146, the pressures thereof against the envelope have a component directed laterally toward the adjacent cutting blades 123 and 124, thereby to urge each side edge of the envelope against the adjacent abutment surface 127.

As shown in FIG. 20a, the lower resilient annular member 144 may be replaced by a rigid annular member 144a which is similarly secured at the inside of the lower cutting blade 124 and presents a smooth cylindrical surface to support the side edge portion of the envelope under the peripheral portion 143 of the upper resilient member 141, whereby only the latter exerts an axially outward directed force on the envelope to urge the side edge of the latter into close contact with the adjacent abutment surface 127.

As shown in FIG. 20b, each lower resilient annular member 144 is replaced by a relatively small roller 202 which presents a smooth surface giving underneath support for the side edge portion of the envelope, and which is mounted for rotation on an axis inclined at an acute angle to the plane of the abutment surface 127 so as to produce on the engaged portion of the envelope, in cooperation with the peripheral resilient portion 143, an even more positive force directed axially outwardly toward the abutment surface. Each roller 202 may be mounted for free rotation on the end of a fixed pin 203 supported by any suitable structure fixed to the frame of the machine.

The material trimmed from the opposite side edges of each envelope by cutting devices 16 falls downwardly along a bent guide or chute 147 (FIG. 8b) and into the previously mentioned drawer 90 which also receives the material removed by cross cutting device 15.

Figure 9C:
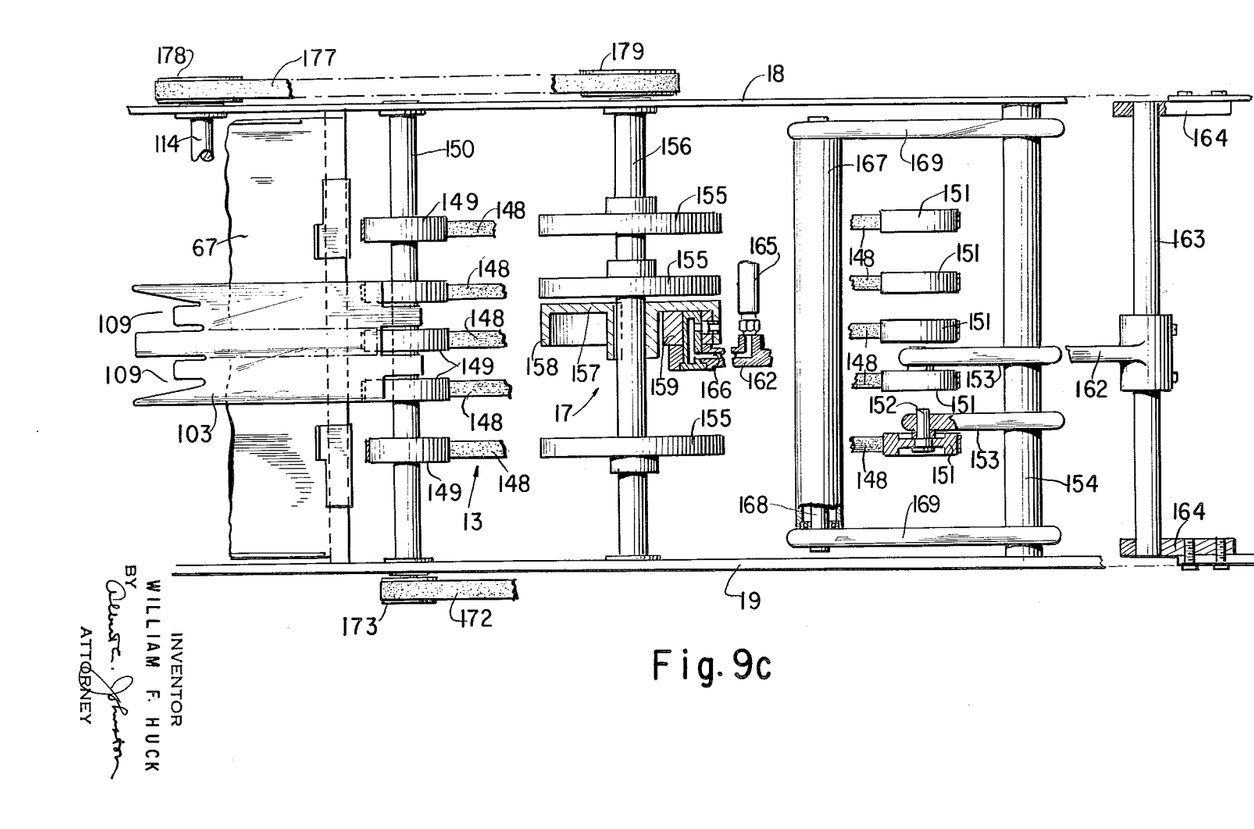
FIG. 9c is a further extended sectional view taken along the line 9c—9c on FIG. 8b.

Each envelope from which the leading edge and opposite side edges have been trimmed by cutting devices 15 and 16, respectively, is moved beyond the side cutting devices by conveyor 12 and is then further transported by the third conveyor 13 (FIGS. 8b and 9c). Conveyor 13 includes endless conveyor belts 148 running around pulleys 149 fixed on a shaft 150 extending laterally below the delivery end of conveyor 12 and having its opposite ends journalled in bearings carried by side frame members 18 and 19. Conveyor belts 148 also travel around idler pulleys 151 each of which is individually rotatably mounted on an axle 152 carried by an upwardly directed arm 153 which is adjustably clamped on a transversely extending rod 154 having its opposite ends secured to side frame members 18 and 19. The arms 153 are angularly adjusted on rod 154 to provide the desired tension in conveyor belts 148, and the arms 153 are dimensioned to suitably position the related idler pulleys 151 so that the upper runs of belts 148 extend substantially horizontally from guide surface 103 of conveyor 12.

As previously mentioned, each cut envelope transported by conveyor 13 under unfolding device 17 includes upper and bottom leaves U and B foldably joined together only at the trailing edge T and having the contents C therebetween.

The unfolding device 17 disposed above conveyor 13 generally includes a series of wheels 155 adjustably fixed on a laterally extending shaft 156 having its opposite ends journalled in bearings carried by side frame members 18 and 19 (FIG. 9c), and an additional wheel 157 also adjustably fixed on shaft 156 and being substantially centrally located along the latter. Wheel 157 has an axially directed peripheral flange 158, the outer diameter of which is substantially equal to the diameters of the wheels 155, and shaft 156 is vertically located above the path of travel of the conveyed envelopes so that the peripheries of wheels 155 and 157 effect rolling contact with each envelope as the latter is carried thereunder by the upper runs of conveyor belts 148.

Unfolding unit 17 further includes a block 159 having the shape of a segment of a circle equal in diameter to the inner diameter of flange 158 and being mounted within the flange at a fixed location with the arcuate surface of block 159 facing the inner surface of flange 158. Block 159 has a chordal slot 160 opening at the arcuate surface thereof and being covered by the inner surface of flange 158 to define a vacuum chamber which intermittently communicates with an opening 161 (FIG. 8b) extending radially through flange 158 of rotated wheel 157. Block 159 is supported by an arm 162 which extends generally upwardly from the side of block 159 facing away from wheel 157 and which is adjustably secured, at its upper end, on a laterally extending rod 163 having its opposite ends mounted in brackets 164 which project from side frame members 18 and 19. A flexible hose 165 extends from the suction pump 62 or other source of vacuum to a passage 166 formed in arm 162 and opening into the vacuum chamber 160 of block 159 so that vacuum is always applied to the chamber 160.

The locations of block 159 and opening 161 in flange 158 are selected so that, when an envelope on conveyor 13 passes under wheel 157, opening 161 is at the bottom of flange 158 as the latter initially effects rolling contact with the upper leaf U of the cut envelope and simultaneously communicates with vacuum chamber 160 so that the leading edge portion of the upper leaf U is made to adhere to the surface of flange 158. As wheel 157 continues to rotate and the cut envelope is further moved by conveyor 13, the vacuum still causes the upper leaf U to adhere to flange 158 and thereby be pivoted upwardly about the trailing edge T of the envelope while the contents C remain on the bottom leaf B which rests on conveyor 13, as shown in FIG. 6. Further rotation of wheel 157 and further movement of the bottom leaf B of the envelope on conveyor 13 results in pivotal movement of the upper leaf U beyond the vertical position, as shown in FIG. 7, whereupon opening 161 moves out of communication with vacuum chamber 160 so as to release upper leaf U from flange 158.

In order to ensure that the contents of the envelope will remain upon the bottom leaf during unfolding of the envelope, as described above, and further to complete the pivotal movement of the upper leaf U into the plane of the bottom leaf B, the unfolding device 17 includes a hold-down roller 167 extending laterally across the upper runs of conveyor belts 148 (FIGS. 8b and 9c) and being rotatably mounted on an axle 168 having its opposite ends supported by arms 169 which are adjustably secured to lateral rod 154. Arms 169 are angularly adjusted on rod 154 so that hold-down roller 167 presses downwardly on each unfolded envelope as the latter passes thereunder on conveyor belts 148.

It will be apparent that each opened and unfolded envelope arriving at the delivery end of conveyor 13 has its contents C fully exposed on the bottom leaf B for convenient removal from the latter. The contents may be removed from each envelope at the delivery end of conveyor 13, or the opened envelopes, in the condition illustrated in FIG. 2, may be further transported from the delivery end of conveyor 13 by suitable conveyor means (not shown) to a work station at which the contents are removed from the envelopes for further processing, such as, sorting or filing.

The various above described operating components of envelope opening machine 10 are driven by a variable speed electric motor 170 (FIG. 8b) mounted on the laterally extending frame member 21 and having its drive shaft connected to a drive pulley 171 through a conventional magnetic clutch (not shown) which is adapted to disengage if a load in excess of a predetermined value is imposed on drive pulley 171. Pulley 171 drives an endless belt 172 running around pulleys 173, 174, 175 and 176 (FIGS. 8b and 9b) which are respectively secured on the ends of shafts 150, 114, 125 and 126 projecting beyond side frame member 19, thereby to drive conveyor 13, conveyor 12, and the upper and lower shafts 125 and 126 of side cutting devices 16. It will be noted that belt 172 is wrapped in opposite directions around pulleys 175 and 176 so that shafts 125 and 126, and hence the upper and lower cutting blades 123 and 124 of the side cutting devices, are counter-rotated for most desirable shearing action on the side edges of the envelopes. Shaft 156 of unfolding device 17 is rotatably driven from shaft 114 of conveyor 12 through an endless drive belt 177 running around pulleys 178 and 179 secured on shafts 115 and 156, respectively, at ends of such shafts projecting beyond side frame member 18 (FIGS. 9b and 9c). Further, the previously described drive gear 97 through which shaft 26 is rotated for operating conveyor 11, cross cutting device 15 and delivery device 55, is rotated by meshing engagement with a spur gear 180 (FIG. 9b) fixed on shaft 112 of conveyor 12 at an end of such shaft projecting beyond side frame member 19.

Since cross-cutting device 15 is driven from pulley 171, as are the other operating components of machine 10, the jamming of rotor 77 which results when two or more envelopes are simultaneously fed to device 15, as previously described in detail herein, produces an excessive load on pulley 171 to cause disengagement of the above mentioned magnetic clutch by which the latter is driven from motor 170 whereby operation of the entire machine is suspended until the jammed envelopes are manually removed from cross-cutting device 15. Thus, the described machine 10 automatically prevents the appearance at the unfolding device 17 of two or more superposed cut envelopes. Obviously, if two or more superposed cut envelopes passed under unfolding device 17, the latter would be operative only to unfold the uppermost of the superposed envelopes, in which case the contents of the lower envelopes would not be exposed.

It will be apparent that the above described machine 10 is automatically operative to cut the successive envelopes along three edges thereof and then to unfold the cut envelopes along the remaining or fourth edge for full exposure of the contents, while the envelopes are continuously moved in a substantially rectilinear path so as to permit high speed operation of the machine and the expeditious handling of large volumes of mail. Since the width of material trimmed from three edges of each envelope by cutting devices 15 and 16 is precisely controlled, the amount of material removed is sufficient to ensure the reliable opening of the envelope edges, but is so small, for example, between 0.015 and 0.020 inch, that the contents of the envelopes are safeguarded against damage due to the cutting operations.

Although specific embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. An envelope opening machine comprising conveyor means for moving successive envelopes disposed flatwise thereon continuously through a substantially rectilinear path constantly in substantial alignment with the plane of each envelope moving thereon, means for depositing envelopes to be opened one after another flatwise onto said conveyor means, continuously rotating cross-cutting means at one location in said path operative to trim from each envelope the leading edge thereof during movement of the envelope by said conveyor means, and side cutting means in said path beyond said cross-cutting means and operative as each envelope is moved through said path location, to trim off the opposite side edges of the envelope, whereby each envelope while being continuously moved through said path is opened along three edges thereof so as to consist of top and bottom leaves joined together along the trailing edge thereof with the contents of the envelopes disposed between said leaves.

2. An envelope opening machine comprising continuously moving conveyor means for transporting sucessive envelopes disposed flatwise thereon in a substantially rectilinear path constantly in substantial alignment with the plane of each envelope moving thereon, means for depositing envelopes to be opened one after another flatwise onto said conveyor means, continuously rotating cross-cutting means operative to trim from each envelope the leading edge thereof at one location in said path, side cutting means operative in said path beyond said cross-cutting means to trim off the opposite side edges of each envelope so that each envelope then consists of top and bottom leaves joined together along the trailing edge of the envelope with the contents of the envelope disposed between said leaves, and unfolding means operative on each envelope during movement of the latter in said path following the operation on the envelope of said cross-cutting means and side cutting means to lay back the top leaf of the envelope into the plane of the bottom leaf thereof so that the contents are then fully exposed on said bottom leaf.

3. An envelope opening machine according to claim 1, said conveyor means including a first pair of laterally spaced apart endless members guided to have runs extending parallel to and flanking said path, and pushers supported by said endless members and projecting upwardly through said path during movement along said runs; said cross-cutting means including a fixed blade extending laterally between said runs intermediate the ends of the latter, a rotatable shaft extending laterally with respect to said path and spaced from the latter, a rotor extending radially from said shaft and of limited angular extent to move through said path during a portion of each revolution of the shaft and to withdraw from said path during the remainder of each revolution, and a movable blade carried by said rotor and extending substantially parallel to the axis of said shaft to cooperate with said fixed blade in exerting a shearing action upon rotation of said shaft; said conveyor means further including an auxiliary pair of parallel, laterally spaced apart endless members guided to have runs also flanking said path and extending along at least portions of said runs of the first pair of endless members, and support bars extending laterally between said endless members of the auxiliary pair to support each envelope during movement of the latter by said pushers past said fixed blade; and continuously operated drive means operatively connected to said endless members of both pairs and to said shaft and synchronizing the movement of said pushers and support bars along the respective runs with the rotation of said shaft so that the leading edge is trimmed from each envelope by said cooperative shearing action of the movable and fixed blades and said rotor moves through said path between said runs in advance of the cut envelope to avoid interference by said cross-cutting means with further transport of the cut envelope by said pushers and support bars.

4. An envelope opening machine as in claim 3, wherein said drive means includes first and second rotatable drive members connected to said first pair and said auxiliary pair, respectively, and being rotatably adjustable relative to each other to vary the spacing between said pushers and support bars for accommodating envelopes of different sizes, and means for locking said first and second rotatable drive members relative to each other; and wherein said second rotatable drive member is also operatively connected to said shaft of the cross-cutting device so that the positional relationship of said movable blade and said support bars remains unchanged when varying the spacing between said pushers and support bars.

5. An envelope opening machine according to claim 1, said side cutting means comprising mechanisms disposed adjacent the opposite sides of said path for simultaneously trimming off both side edges of each envelope, each of said mechanisms including upper and lower rotated circular cutting blades having overlapping peripheral cutting edges lying in a common plane to shear each envelope along the adjacent side edge of the latter as the envelope moves in said path, and a mounting structure supporting said upper blade and rotatable with the latter, said mounting structure having an annular, generally radially directed abutment surface facing axially toward the adjacent upper cutting blade and being spaced a small axial distance outward from said common plane of the cutting edges, said mechanism being laterally adjusted so that the axial distance between said annular abutment surfaces thereof is less than the distance between the side edges of each envelope, whereby the latter is bowed out of a flat plane by engagement of the side edges thereof with said abutment surfaces to ensure that the width of material removed from each side edge is equal to said small axial distance between each abutment surface and the common plane of the cutting edges of the associated blades.

6. An envelope opening machine according to, claim 5; wherein each of said side cutting means further includes a member disposed at the inside of said upper cutting blade and having a resilient peripheral portion dimensioned to bear against the top surface of each envelope and inclined in a direction toward the adjacent abutment surface to exert an axially directed component of force on the envelope, means for moving said member so as to move said peripheral portion in the direction of movement of the envelope, and movable means for supporting the envelope under the area at which said resilient peripheral portion bears against the envelope.

7. An envelope opening machine according to, claim 6; wherein said movable means comprises a peripheral portion dimensioned to bear against and movable with the bottom surface of each envelope and moved in a direction toward the adjacent abutment surface to also exert an axially directed component of force on each envelope.

8. An envelope opening machine according to, claim 5; further comprising upper and lower rotated shafts, said upper shaft carrying said mounting structures of the upper cutting blades, means for adjusting said mounting structures of the upper cutting blades along said upper shaft, said lower cutting blades being axially slidable along said lower shaft, and spring means on said lower shaft urging said lower cutting blades axially apart and against the related upper cutting blades.

9. An envelope opening machine according to claim 3, said unfolding means comprising a rotated unfolding member disposed above said path at a location following said cutting means and formed with an arcuate surface for contact with each cut envelope as the latter passes under said unfolding member, said rotary unfolding member having an opening positioned in said arcuate surface so as to be covered by the top leaf of an envelope during said contact with the latter, and means for applying a vacuum to said opening during said contact with an envelope so that the top leaf to the latter is made to adhere to said arcuate surface during continued movement of the bottom leaf in said rectilinear path and by the rotation of said member is unfolded about the trailing edge of the envelope to expose the contents of the latter on the bottom leaf.

10. An envelope opening machine comprising continuously moving first conveyor means having parallel spaced apart runs carrying upwardly projecting spaced apart pushers therebetween, feeding means for delivering envelopes one after another flatwise onto said runs of the first conveyor means for transport by said pushers in a substantially rectilinear path constantly in substantial aligment with the plane of each envelope moving thereon, continuously rotated cross-cutting means located between said runs of the first conveyor means to trim from each envelope the leading edge thereof, means defining a supporting surface extending longitudinally from said runs of the first conveyor means, continuously moving second conveyor means having runs extending from above said first conveyor means along said supporting surface and from which spaced apart pushers depend for transporting the successive envelopes along said supporting surface in an extension of said rectilinear path, said pushers of the second conveyor means clearing said first conveyor means and said pushers of the latter, and continuously rotated side cutting means spaced outwardly from said runs of the second conveyor means and operative to trim off the opposite side edges of each envelope during transporting of the latter along said supporting surface by said pushers of the second conveyor means so that each envelope then consists of top and bottom leaves joined together only along the trailing edge and having the contents of the envelope disposed therebetween.

11. An envelope opening machine as in claim 10; further comprising continuously moving third conveyor means having upwardly facing runs extending longitudinally from said supporting surface and along which the successive envelopes are transported in a further extension of said rectilinear path, a rotary unfolding member disposed above said further extension of the path and formed with an arcuate surface for rolling contact with each envelope during movement of the latter under said unfolding member, said arcuate surface having an opening therein adapted to be covered by the top leaf of each envelope during said rolling contact with the latter, and means applying a vacuum to said opening during said rolling contact with an envelope so that the top leaf of the latter adheres to said arcuate surface and is laid back onto said runs of the third conveyor means to completely expose the contents of the envelope on its bottom leaf.

12. An envelope opening machine comprising conveyor means defining a substantially rectilinear path of travel and having an envelope receiving end and an envelope delivering end, a magazine for a stack of envelopes to be opened disposed above said receiving end of said path, feeding means acting to deposit envelopes from said stack one after another flatwise on said conveyor means for transport by the latter in said path which is constantly in substantial alignment with the plane of each envelope moving on the conveyor means, continuously rotating cross-cutting means extending across said path and operative to trim the leading edge from each envelope, continuously rotating side cutting means disposed at the opposite sides of said path and operative to cut both side edges of each envelope moving in said path so that the envelope then consists of top and bottom leaves connected only along the trailing edge of the envelope with the contents of the latter between said leaves, and unfolding means acting upon the top leaf of each envelope as the latter approaches said delivery end of the path to lay back the top leaf into the plane of the bottom leaf and thereby fully expose the contents of the envelope on the bottom leaf.

13. An envelope opening machine comprising a magazine for holding a stack of envelopes to be opened; first conveyor means including a pair of endless conveyor members guided to move along parallel, rectilinear upper runs passing under said magazine and being spaced apart laterally by a distance greater than the corresponding dimension of envelopes in said magazine, and lateral members extending between said conveyor members and having pushers which project upwardly therefrom during movement along said runs; feeding means delivering successive envelopes from said magazine flatwise onto said first conveyor means for transport in the plane of said runs by engagement of said pushers with the trailing edge of each envelope; cross-cutting means spaced from said magazine in the direction of movement of said runs and including a fixed blade extending laterally between said runs of the conveyor members, and a movable blade continuously rotated about a laterally extending axis in synchronism with the movement of said operative runs of the conveyor members and having a cutting edge spaced from, and being generally parallel to said axis to cooperate with said fixed blade in shearing the leading edge of each envelope; means defining a horizontal supporting surface extending longitudinally from the end of said runs toward which said conveyor members move; second conveyor means including endless conveyor members guided to move along lower runs extending from above said runs of the first conveyor means along said supporting surface and having pushers depending therefrom below said supporting surface during movement along said lower runs; means synchronizing the movements of the first and second conveyor means so that pushers of said second conveyor means engage the trailing edge of each envelope as the latter is transferred from said first to said second conveyor means and thereby further transport the envelope along said supporting surface; and rotary side cutting means disposed at the opposite sides of said supporting surface and spaced outwardly from said conveyor members of the second conveyor means to trim off the opposite side edges of each envelope as the latter is made to travel along said supporting surface by said second conveyor means.

14. An envelope opening machine as in claim 13; wherein each of said side cutting means includes upper and lower rotary cutting blades rotating in vertical planes and having peripheral cutting edges that extend in a common plane below and above, respectively, the plane of said supporting surface so as to cooperate in shearing along the adjacent side edge of each envelope, and means rotatable with each upper cutting blade and defining an annular abutment surface spaced outwardly from the cutting edge of said upper cutting blade by a small axial distance and being engaged by the adjacent side edge of each envelope while said cutting edges shear therealong so that the width of material trimmed off each side edge of the envelope is equal to said small axial distance.

15. An envelope opening machine as in claim 14; further comprising upper and lower counter-rotated shafts to support the upper and lower cutting blades of said side cutting means, said upper shaft having threads thereon, each of said upper cutting blades being carried by a mounting structure adjustable along said upper shaft to accommodate envelopes of different sizes, each of said lower cutting blades being carried by a mounting structure movable axially along said lower shaft, and a spring on said lower shaft acting against said mounting structures of the lower cutting blades to hold the latter in operative engagement with the related upper cutting blades.

16. An envelope opening machine as in claim 14; wherein each of said side cutting means further includes a disc disposed at the inside of said upper cutting blade and being resilient at least in the peripheral portion thereof, said peripheral portion of the disc being dimensioned to bear against the top surface of each envelope and being inclined from a radial plane in the direction toward the adjacent upper cutting blade to exert an axially directed component of force on the envelope, and rotatable means supporting the envelope under the area at which said resilient peripheral portion bears against the envelope.

17. An envelope opening machine according to claim 1, said cross-cutting means comprising
a fixed blade extending laterally across said path,
a rotatable shaft above and extending laterally of said path ahead of said blade,
a rotor on said shaft,
a movable blade carried by said rotor and extending substantially parallel to the axis of said shaft and cooperating with said fixed blade to exert a shearing action upon rotation of said shaft,
an arcuate abutment surface on said rotor extending from said movable blade in the direction of rotation of said rotor and shaft, said movable blade having a cutting edge projecting radially beyond said abutment surface by a predetermined small distance,
and means for driving said conveyor means and said shaft continuously in synchronism,
said conveyor means being operative to bring the leading edge of the envelope into contact with said abutment surface as the latter is moved across said path and to continue pushing the envelope forwardly as the abutment surface progresses across said path,
whereby to bow out of said path a portion of the envelope between said drivingly engaged portion and said abutment surface and thereby ensure even contact of said leading edge with said surface for control of the width of material trimmed from the leading edge.

18. An envelope opening machine comprising conveyor means for moving successive envelopes disposed flatwise thereon continuously through a substantially rectilinear path constantly in substantial alignment with the plane of each envelope thereon, means for depositing envelopes to be opened one after another flatwise onto said conveyor means, continuously rotated, cross-cutting means at one location in said path operative to trim from each envelope the leading edge thereof during movement of the envelope by said conveyor means, and side cutting means in said path beyond said cross-cutting means and operative as each envelope is moved through said path to trim off the opposite side edges of the envelope, said cross-cutting means including a fixed blade extending laterally across said path, a rotatable shaft extending laterally with respect to said path and spaced from the latter, a rotor projecting radially from said shaft and having a limited angular extent so that said rotor moves through a part of said path during a portion of each revolution of said shaft and is withdrawn from said path during the remainder of each revolution, and a movable blade carried by said rotor and extending substantially parallel to the axis of said shaft to cooperate with said fixed blade in exerting a shearing action upon rotation of said shaft; and drive means for said conveyor means and said shaft for rotating said shaft in the direction to move said rotor forwardly through said path part and for synchronizing the movement of the successive envelopes in said path with the rotation of said shaft so that the leading edge is trimmed from each envelope by said cooperative shearing action of said movable and fixed blades and said rotor is thereafter with continued rotation of said shaft moved forwardly through said path part in advance of the cut envelope to avoid interference with further transport of the cut envelope in said path, said side cutting means including at each side of said path upper and lower rotated cutting blades having overlapped peripheral cutting edges lying in a common plane to shear each envelope along the adjacent side edge of the latter as the envelope moves in said path and means defining an abutment surface at a fixed axial distance outwardly from said common plane of the cutting edges of the related blades, said side cutting means being laterally spaced apart to engage the side edges of each envelope with said abutment surfaces of the side cutting means during shearing of the envelope by said blades of the side cutting means so that the width of material removed from the side edges of each envelope is precisely equal to said fixed axial distance between the abutment surface and the common plane of the cutting edges of each side cutting means, and continuously rotated unfolding means operative on each envelope in a portion of said path beyond said side cutting means to lay back the top leaf of the cut envelope to the plane of the bottom leaf thereof and thus expose the contents thereof on said bottom leaf.

References Cited by the Examiner
UNITED STATES PATENTS

| | | | |
|---|---|---|---|
| 771,852 | 10/1904 | Wolf | 120—35 |
| 965,868 | 8/1910 | Byrnes | 120—35 X |
| 1,143,919 | 6/1915 | Scott | 83—421 |
| 1,194,701 | 8/1916 | Bircher | 83—421 |
| 1,379,597 | 5/1921 | Trogner | 83—421 |
| 1,724,199 | 8/1929 | Hoag | 271—2 |
| 1,745,442 | 2/1930 | Orndoff | 83—262 |
| 1,825,223 | 9/1931 | Deck | 83—430 |
| 2,241,395 | 5/1941 | Egling | 83—430 |
| 2,397,603 | 4/1946 | Hackett | 83—302 |
| 2,598,820 | 6/1952 | Neese | 83—302 |
| 2,821,253 | 1/1958 | Heffelfinger | 83—262 |
| 3,039,248 | 6/1962 | Jones | 53—381 |
| 3,116,718 | 1/1964 | Krupotich et al. | 120—35 |
| 3,132,629 | 5/1964 | Krupotich | 120—35 |
| 3,143,100 | 8/1964 | Krupotich | 120—35 |

EUGENE R. CAPOZIO, *Primary Examiner.*

EDWARD C. ALLEN, ANDREW J. JUHASZ, LAWRENCE CHARLES, *Examiners.*